ial) United States Patent
Tanner

(10) Patent No.: US 8,967,993 B2
(45) Date of Patent: Mar. 3, 2015

(54) DEVICE FOR BLOWING OUT HOLLOW BODIES MADE OF PLASTICS

(71) Applicant: M. Tanner AG, Illnau (CH)

(72) Inventor: Marcel Tanner, Bassersdorf (CH)

(73) Assignee: M. Tanner AG, Illnau (CH)

( * ) Notice: Subject to any disclaimer, the term of this patent is extended or adjusted under 35 U.S.C. 154(b) by 139 days.

(21) Appl. No.: 13/719,929

(22) Filed: Dec. 19, 2012

(65) Prior Publication Data

US 2013/0156882 A1 Jun. 20, 2013

(30) Foreign Application Priority Data

Dec. 19, 2011 (CH) ...................................... 2004/11

(51) Int. Cl.
*B29C 49/36* (2006.01)
*B08B 9/28* (2006.01)
*B08B 9/34* (2006.01)
*B29C 49/06* (2006.01)

(52) U.S. Cl.
CPC .................. *B29C 49/36* (2013.01); *B08B 9/283* (2013.01); *B08B 9/286* (2013.01); *B08B 9/34* (2013.01); *B29C 49/06* (2013.01)
USPC ....................................................... 425/535

(58) Field of Classification Search
CPC .......... B08B 9/283; B08B 9/286; B08B 9/30; B08B 9/34; B29C 49/06; B29C 49/36
USPC ........................................................ 425/535
See application file for complete search history.

(56) References Cited

U.S. PATENT DOCUMENTS

| 3,481,348 A | 12/1969 | Keine |
| 5,913,237 A | 6/1999 | Gysi |
| 6,173,827 B1 | 1/2001 | Carey |
| 2007/0240784 A1 | 10/2007 | Wu et al. |
| 2011/0272861 A1 | 11/2011 | Humele |

FOREIGN PATENT DOCUMENTS

| DE | 9403641 | 1/1995 |
| DE | 101 40 906 A1 | 3/2003 |
| DE | 102008056346 | 5/2010 |
| EP | 0759330 | 2/1997 |
| GB | 2123803 | 2/1984 |

OTHER PUBLICATIONS

Machine Translation of DE 9403641 provided by Espace.net on Jul. 1, 2014.*

(Continued)

*Primary Examiner* — Alison Hindenlang
(74) *Attorney, Agent, or Firm* — Notaro, Michalos & Zaccaria P.C.

(57) ABSTRACT

A device has a freely rotatable rotor (13), which is equipped at its circumference with multiple nozzle heads (14). The rotor (13) is arranged above a row of preforms (1), wherein these preforms (1) are moved onto feed rails (7, 8) in conveying direction (9). At least one of the nozzle heads (14) respectively immerses into the hollow space (11) of a preform (1) and is taken along by the latter in conveying direction (9). During the immersion, a gas stream is blown into the hollow space (11) of the preform (1) by a nozzle (16) in the nozzle head (14).

14 Claims, 3 Drawing Sheets

(56) References Cited

OTHER PUBLICATIONS

"Turbine", wikipedia, Aug. 17, 2014, accessed at http://en.wikipedia.org/w/index.php?title=Turbine&oldid=445404870 on Jul. 2, 2014.*

Search Report for Swiss Appiication No. CH20042011 filed Dec. 19, 2011.

* cited by examiner

DEVICE FOR BLOWING OUT HOLLOW BODIES MADE OF PLASTICS

FIELD AND BACKGROUND OF THE INVENTION

The invention relates to a device for blowing out hollow bodies, as for example preforms for plastic containers, in a conveyor assembly, wherein the hollow bodies are open at one end and are closed at the other end, and comprise at the open end a head with a collar, wherein the conveyor assembly comprises a transport line with feed rails being inclined in the conveying direction, wherein the hollow bodies are supported on the feed rails with the collar and with the open end upwardly directed, and are arranged in a row with an axial distance to one and another and are conveyed along the transport line and wherein a facility for blowing a gas stream into the hollow space of the hollow bodies is arranged in a partial area of the transport line.

Devices for cleaning hollow bodies, as for example bottles or preforms for plastic bottles, through flushing respectively blowing out the hollow space of such hollow bodies with water and/or a gas stream are known in production lines for such containers. From U.S. Pat. No. 6,173,827 a device for cleaning the hollow space of preforms made of plastics for plastic bottles is known. Such preforms are regularly cylindrically shaped hollow bodies with an open and a closed end, which comprise a collar in the area of the open end which comprises a larger diameter than the rest of the hollow body. These preforms are correctly positioned in generally known assemblies and are arranged in a row. This row of an adjacently arranged preforms is conveyed in the described device on an sloped chute with rails, also known as feed rails, from a processing station to a subsequent processing station, e.g. a plastic blow moulding machine. These feed rails thereby form a transport line of a conveying assembly. In a partial area of this transport line, respectively this sloped chute, in which the preforms are supported with their collars on the support rails, a device for cleaning the preforms is arranged. In this device the preforms are turned by 180°, such that their opening is downwardly directed and the preforms are thereby further conveyed in transport direction. Below the preforms and with a distance thereto, multiple nozzles are arranged through which ionized gas is blown into the hollow space of the preforms. Through the ionized gas electrostatic loads are neutralized and possible dirt particles and impurities in the hollow space of the preforms may fall out downwardly. Subsequently, the preforms have to be turned again by 180° such that they, again in the correct position, may be transferred with outwardly directed opening to the feed rails. The turning of the preforms according to this solution requires extensive measures as well as an additional assembly, which interrupts the feed rails and in view of the increasingly higher conveying speeds and also as a consequence of the continuously lighter preforms the transportation is very difficult and partially impossible.

DE 101 40 906 A1 discloses a further method and a device for cleaning hollow preforms made of plastics. In this solution the preforms are taken over by an infeed star wheel from a conveyor channel and are sorted and separated. Subsequently, the preforms are transferred to a star wheel in which they are supported by means of their collar in a vertically hanging manner, wherein the open end is upwardly directed. Across a partial area of the star wheel a device is arranged by means of which a lance may be moved into the hollow space of the preform, wherein this lance comprises an air nozzle at the front end. Via this lance ionized air is blown against the closed end of the preform, which then flows out between the wall of the preform and the lance and is sucked-off above the open end of the preform. This lance has to run over a certain period of time synchronically with the star wheel respectively the preforms in the conveying direction and has to be moved into the preforms, stopped and retracted again during this time span. In this device the preforms do not have to be turned. However, it has the disadvantage that the conveying channel and thus the transport flow is interrupted by the star wheel, which represents an additional source of failure. Moreover, the assembly of the star wheel and the related device with the extendible/retractable lances is extremely extensive and failure prone and the effort for the mechanics and the control becomes very high.

In order to save raw material and production costs, it is attempted to produce hollow bodies from plastic material and therefore also the respective preforms with thinner walls and lighter. The result is, that the handling of the preforms in automated transport devices becomes increasingly difficult and failure prone. It is therefore desired, not to interrupt the transport flow of the hollow bodies, e.g. of the preforms, for the blow out procedure and to integrate the blow out procedure into the normal conveying movement of the preforms.

SUMMARY OF THE INVENTION

It is therefore the object of the present invention to provide a device of the above-mentioned type, which overcomes the above described disadvantages. In particular, the present invention shall ensure that the orientation of the hollow bodies on the transport line does not have to be changed for blowing out respectively cleaning, that no additional positioning of the hollow bodies is necessary and that the transport chain does not have to be interrupted. Back and forth movements of parts of the blow out device shall be avoided. The device shall be attachable as an additional element to respective transport lines of hollow bodies, e.g. feed rails or roller conveyors.

This object is solved according to the invention in such a way that above the feed rails and with a distance to the latter a rotatable rotor with multiple radially outwards directed nozzle heads is arranged, wherein each nozzle head comprises a gas feed line and a nozzle, wherein all nozzles are arranged in a common plane, wherein this plane is approximately perpendicular to the supporting surfaces of the feed rails and runs through the central axis of the hollow bodies and wherein, during the conveying of the hollow bodies, the rotor rotates in conveying direction and wherein, in the area between the rotor and the feed rails, at least one nozzle head interacts with the head area of a hollow body, respectively.

By means of the inventive assembly it is possible to blow out and to clean by means of additional assemblies, with a gas stream, in particular an air stream, the hollow bodies respectively preforms during their normal transport movement along the transport line and without changing their position as well as without interrupting the feed rails in the transport line. The rotor with the nozzle heads and the nozzles is driven by the hollow bodies and rotates synchronically with the transport movement of the hollow bodies. Additional control assemblies are not required and may be omitted. There are no parts, which have to carry out back and forth movements and therefore also no accelerating and decelerating forces being directed against each other occur. The common plane, which is intended as a mental aid, in which the nozzles and therefore also the radial axis' of the nozzle heads are arranged and in which also the central axis' of the hollow bodies are arranged, ensures an optimal interaction of the motion sequences of the hollow bodies and the nozzle heads at the rotor.

In accordance with the invention it is further suggested that the nozzle heads with the nozzles respectively comprise the same pitch circle distance to one another and that this pitch circle distance is a function of the axial distance present in conveying direction between adjacent hollow bodies. The axial distance between the hollow bodies respectively preforms being arranged in a row, depends on the shape of these bodies, in particular on their cross-sectional dimensions in the area of the feed rails. In order that the nozzle heads undisturbedly interact with the hollow bodies, the pitch circle distance of the nozzle heads is chosen in such a way that in the area between the rotor and the feed rails and during the transport movement of the hollow bodies always one nozzle head interacts with one hollow body, respectively and that one adjacent nozzle head interacts with the directly succeeding hollow body.

A preferred embodiment of the inventive subject matter provides that in the area of an operating position in which a radial axis of a nozzle head coincides with the longitudinal axis of a hollow body, the nozzle head at least partially immerses into the hollow space of the hollow body. By means of this arrangement, it is achieved that between the nozzle head and the hollow body a secure operative connection is created. Thereby, the nozzle head is taken along by the hollow body, which further moves in the transport direction, and thereby rotates the rotor until the nozzle head swings out of the hollow space of the hollow body.

According to the invention it is further suggested that each of the nozzle heads consists of a spherical segment, the height of which is at least as large as the radius of the sphere, wherein the spherical segment is flattened on two sides and parallel as well as symmetrically to a central plane and comprises two lateral faces. Since most hollow bodies, in particular preforms for plastic containers comprise a circular cross-section, this embodiment of the nozzle body has particular advantages. On the one hand, the nozzle body which is immersed into the hollow space of the hollow body is securely guided in this hollow space. Thereby, the diameter of the original sphere is slightly smaller than the inner-diameter of the hollow space of the hollow body, whereby a free intermediate space is created. On the other hand the spherical segment being flattened by the two lateral faces allows for a sufficiently large passage relative to the walls of the hollow space of the hollow body in order to let the gas respectively the air blown into the hollow space flow out outwardly. In a further advantageous embodiment, grooves are formed in a partial area of the sphere wall of the spherical segment, which also serve as flow channels for the gas respectively the air. It is also advantageous when the immersion depth of the nozzle head in the hollow space of the hollow body is at least as large as the radius of the spherical segment out of which the nozzle head is formed. Thereby, the optimal guidance of the nozzle head in the hollow space of the hollow body is additionally supported. The nozzle heads may, however, also comprise a different shape, e.g. the shape of a truncated cone.

A further preferred embodiment of the inventive subject matter provides that the nozzle heads are connected via a connection element with the rotor and that this connection element comprises a length adjustment. By changing the length of the connection element respectively the radial distance of the nozzles from the axis of the rotor, the diameter of the pitch circle, onto which the nozzles are arranged, may be enlarged or decreased. Thereby, also the pitch circle distance between adjacent nozzle heads may be changed and may thereby be adjusted to the axial distance between two adjacent hollow bodies on the feed rails. This enables in a certain measuring range the adjustment of the rotor with the nozzle heads to different dimensions of the hollow bodies respectively preforms. If this measuring range is not sufficient for the adjustment to the different dimensions of the hollow bodies, the rotor with the nozzle heads may be exchanged and replaced by a rotor with different dimensions or other nozzle heads. This is very simple since the rotor is supported on a fixed rotor axis, which is adjustably mounted at a structure element of the housing of the device.

According to the invention it is further suggested that the rotor is supported on a fixed rotor axis and that the rotor axis comprises an inner gas feed line, which—in the area of the common nozzle plane—is guided radially outwards via a bore into the bearing bore of the rotor, wherein the radially outwards directed bore is directed towards the intermediate area between the rotor and the feed rails. This embodiment enables, as already mentioned, the simple exchange of rotors with nozzle heads and the use of rotors with different dimensions. Simultaneously, via the inner gas feed line with the radially outwards directed bore, the area may be determined in which gas respectively pressurised air is fed to one or more nozzle heads. In a preferred manner, a widened opening is formed at the outlet end of the radially outwards directed bore, at the surface of the rotor axis, by means of which the feed stream of gas to the respective gas feed line of a nozzle head being in operative connection, is determined. By means of a respective design of the widened opening it may e.g. be determined that the nozzle head is only fed with gas respectively air when it is fully immersed and that the air feed is only again interrupted when the nozzle head, fully or partly, swings out again of the hollow space of the hollow body and that the gas stream coming out of the nozzle additionally supports the conveying movement of the hollow bodies in the conveying direction. The gas feed to the inner gas feed line occurs in a generally known manner via a connection to an external source for pressurized gas, in particular pressurized air.

An advantageous embodiment of the invention provides that outer gas feed lines of each nozzle head are guided radially inwards through the connection elements up to the bearing bore of the rotor. This results in a very simple and cost efficient embodiment of the device, wherein the gas respectively air feed to the nozzles is ensured across the entire adjustment area of the nozzle heads.

According to the invention it is further suggested that an auxiliary drive for supporting the rotational movement of the rotor is provided. The auxiliary drive may be formed as a generally known mechanical, hydraulic or pneumatic auxiliary drive. A pneumatic auxiliary drive may be formed in such a way that radially directed elements at the rotor are blown on by an air stream. In the optimal case, the auxiliary drive provides as much driving force that the frictional forces acting upon the rotor may be overcome. In this case, only minimal carrier forces for the rotational movement of the rotor need to be generated by the hollow bodies moved in the transport direction, into which a nozzle body is immersed.

For improving the cleaning effect it is advantageous, if—seen in the conveying direction of the hollow bodies—an additional blow out device is arranged in front of the rotor with the nozzle heads, by means of which ionized gas is blown into the hollow space of the hollow bodies. This principally known arrangement effects that electrical loads in the hollow space of the hollow bodies are neutralized and that dirt particles and impurities may be blown out more easily.

A further preferred embodiment of the inventive subject matter provides that, seen in conveying direction of the hollow bodies, two or more rotors with nozzle heads are arranged one behind another. This arrangement may be advantageous when especially high requirements have to be met with regard to the cleaning effect of the blow out procedure. This arrangement is however also advantageous if the conveying speed of the hollow bodies respectively preforms is very high and the time span in which a nozzle head respectively is immersed into the hollow space of a hollow body is only small. By means of the arrangement of two or more rotors with nozzle heads one behind the other, the cleaning procedure may be improved.

The rotor with the nozzle heads and the rotor axis with the gas feed line form a compact building unit, which may be mounted in an easy manner via respective carrier elements at the supporting structure of a respective conveying assembly with a transport line for hollow bodies. In addition, also the rotor with the nozzle heads may be exchanged in an easy manner such that for groups of differently shaped hollow bodies, rotors and nozzle heads with different geometric design may be defined and prepared. In this way the device may be adapted in an easy manner, when the conveying assembly is changed to hollow bodies with different dimensions. Due to the fact that the nozzle heads at least partially immerse into the hollow space of the hollow bodies, it may be ensured that the gas stream discharging from the nozzles centrally reaches up to the closed end of the hollow space of the hollow body and may after the deflection flow out of the hollow space again in upward direction along the lateral walls. This provides a very good cleaning effect, in particular when the electrical loads in the hollow space of the hollow bodies are neutralized in a pre-stage. The deflection of the air stream discharging from the nozzles is reliably avoided before it reaches the closed end of the hollow body. The cleaning effect is also improved in that the gas stream, during the immersion of the nozzle head in the hollow space, is directed towards the wall of the hollow space in the preform. Thereby, an advantageous flow profile along one side of the hollow space into the hollow body and along the opposite side of the hollow space out of the hollow body results. During retraction of the nozzle head out of the hollow space, the same advantageous flow profile is created, however, in the opposite direction. These changes of the flow direction of the gas in the hollow space of the preforms lead to an improved cleaning effect. The inventive device enables a motion sequence of all moving parts, which occurs synchronically with the conveying movement of the hollow bodies on the feed rails. The hollow bodies neither have to be turned nor has their motion sequence to be changed in any other way. Also, the conveying line does not have to be interrupted for the inventive device.

BRIEF DESCRIPTION OF THE DRAWINGS

In the following, the invention is described in more detail by means of exemplary embodiments under reference to the enclosed drawings. It shows in schematic illustration, respectively.

DESCRIPTION OF THE PREFERRED EMBODIMENTS

Figure 1:
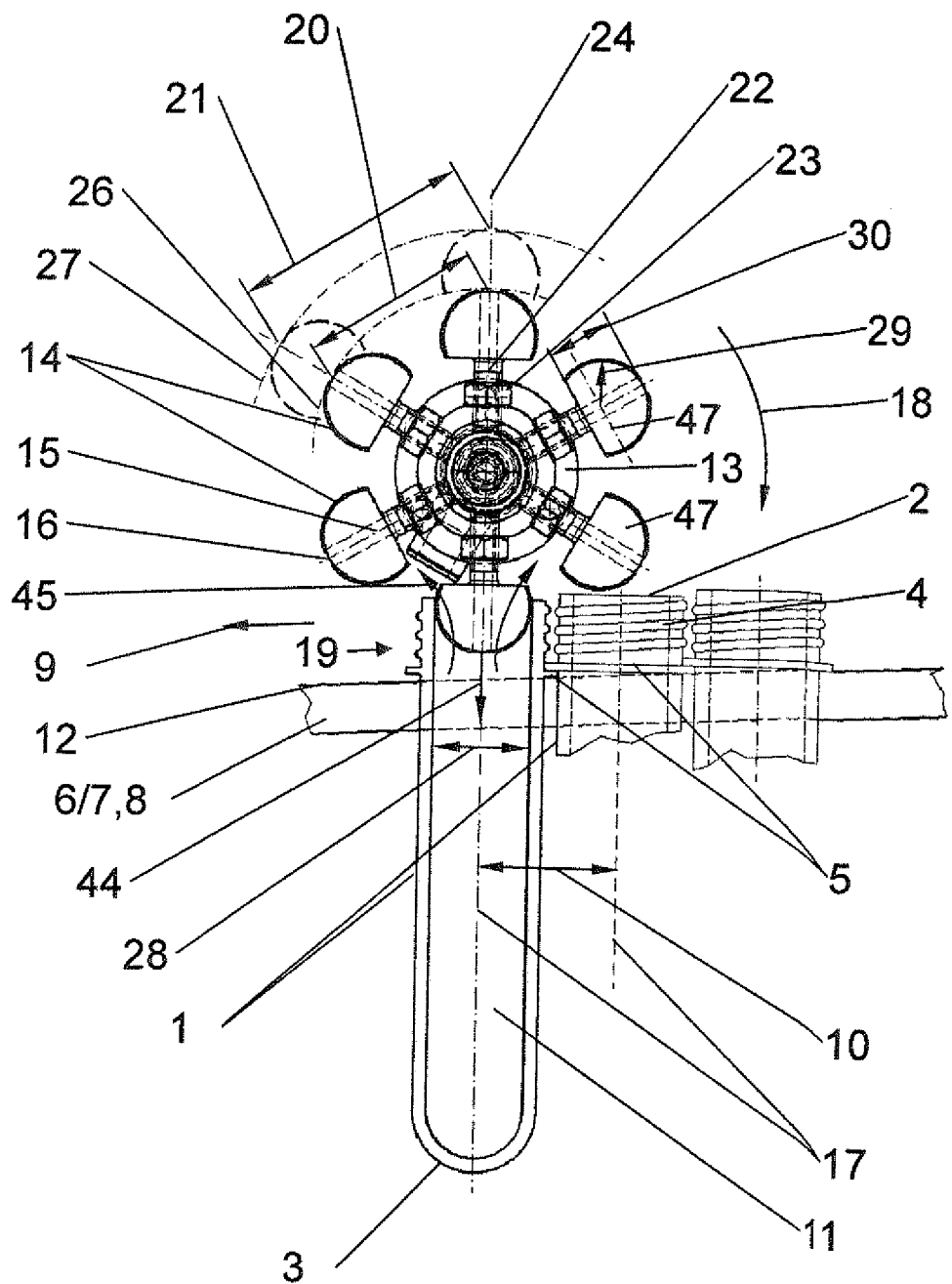
FIG. 1 a side view of an inventive rotor with nozzle heads with a cutout of the feed rails with preforms, FIG. 2 a cross-section through the assembly according to FIG. 1 along the vertical axis and FIG. 3 a perspective view of an inventive rotor with nozzle heads.

FIG. 1 shows a partial view of a conveyor assembly with a transport line 6 for preforms 1 for plastic containers, namely in an area where the preforms 1 are already correctly positioned and sorted in one row and are conveyed on feed rails 7, 8. The feed rails 7, 8 are sloped, i.e. inclined in the conveying direction 9, whereby the preforms 1 are conveyed by means of gravity force and the dynamic pressure of the subsequent row of preforms 1 in the conveying direction 9. The preforms 1 are longitudinal cylindrical bodies with an open end 2 and a closed end 3 and comprise at the open end 2 a head 4 with thread profiles and at least one collar 5. The collar 5 thereby comprises a larger diameter than the cylindrical part of the preform 1. The preforms 1 comprise an inner hollow space 11 and a central axis 17. The preforms 1 are supported with the collar 5 on supporting surfaces 12 of the feed rails 7, 8 and are arranged in a row, whereby adjacent preforms 1 respectively comprise an equal axial distance 10 of the central axis' 17 to one another.

Above the feed rails 7, 8 and thus above the row of preforms 1 running through in the conveying direction 9, a rotor 13 with radially outwards directed nozzle heads 14 is arranged. In the example shown, six nozzle heads 14 are provided. The number of the provided nozzle heads 14 may also be smaller or larger and it depends on the shape and the geometric dimensions of the preforms 1 as well as on the geometric dimensions and the position of the rotor 13. The nozzle heads 14 are respectively connected with the rotor 13 via a connection element 22 and are equipped with a gas feed line 15 and a nozzle 16. The connection elements 22 comprise a length adjustment—in the illustrated example a thread arrangement 23. By means of this length adjustment 23, the distance of the nozzle head 14 respectively the nozzles 16 from the rotation axis 25 of the rotor 13 in the direction of the radial axis' 24 may be changed in a predetermined range. This enables the variation of the distance of adjacent nozzles 16 between a minimal pitch circle distance 20 on an inner pitch circle 26, and a maximal pitch circle distance 21 on an outer pitch circle 27. This adjustment option enables the adjustment of the device to different preforms 1 and namely over a predetermined range of deviations of the height of the head 4 and/or the geometric design of the collar 5. The nozzle heads 14 are thereby formed in such a way that they may act together with the head area 4 and the hollow space 11 having the inner diameter 28. In this regard, the nozzle heads 14 consist of a spherical segment having a radius 29 and a height 30. The diameter of the nozzle heads 14 which corresponds to the double radius 29 is slightly smaller than the diameter 28 of the hollow space 11 of the preforms 1. In the illustrated example, the diameter 28 of the hollow space is e.g. 22 mm and the diameter respectively the double radius 29 of the nozzle heads 14 is approximately 0.2-0.3 mm smaller. In principle, nozzle heads can be produced for any diameter variant. The nozzle heads 14 may also comprise a different appropriate shape, e.g. the shape of a truncated cone.

In the operating position shown in FIG. 1, the radial axis 24 of the downwardly directed nozzle head 14 coincides with the longitudinal axis respectively central axis 17 of a preform 1. Thereby, the distance of the nozzle head 14 from the rotation axis 25 of the rotor 13 is set in such a way that the nozzle head 14 immerses at least partially in the area 19 between the rotor 13 and the feed rails 7, 8 into the hollow space 11 of the preform 1. The immersion depth is thereby determined in such a way that the largest diameter of the nozzle head 14 is arranged in the hollow space 11 of the head 4, i.e. the immersion depth is at least as large as the radius 29 of the spherical segment out of which the nozzle head 14 is formed.

Figure 2:
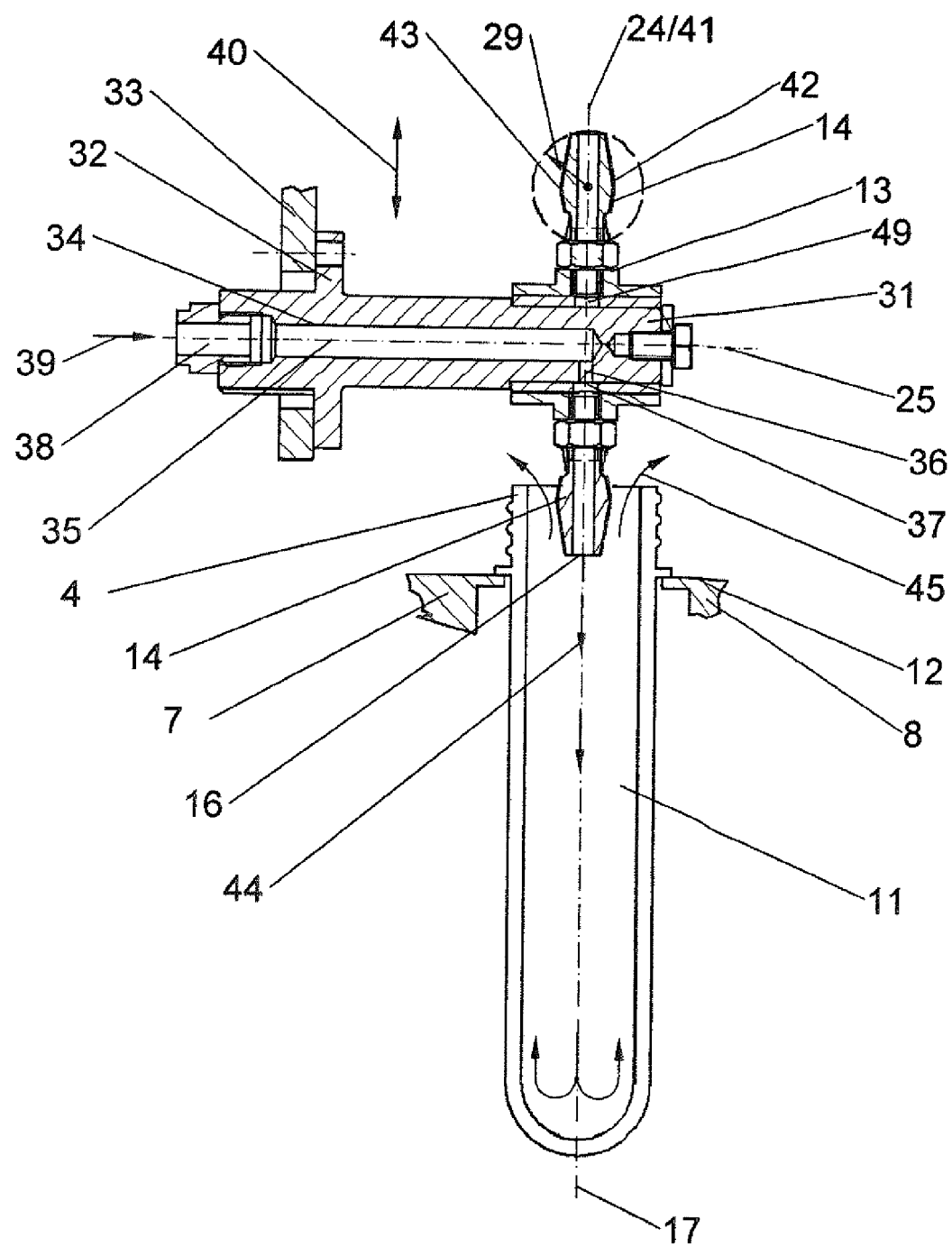

In FIG. 2, a cross-section through the arrangement according to FIG. 1 along the vertical axis respectively the coinciding central axis 17 of the preform 1 and the radial axis 24 is illustrated and shows further details of the device. The rotor 13 is supported on a fixed rotor axis 31, wherein this rotor axis 31 is releasably connected via a flange 32 with a structure element 33 of the housing of the device (not shown). The rotor 13 is freely rotatable about the rotational axis 25. The position, i.e. the distance of the rotation axis 25 from the supporting surfaces 12 of the feed rails 7, 8 is adjustable by means of the flange 32 being displaceable relative to the structure element 33 in the direction of the arrows 40. The rotor axis 31 comprises an inner gas feed line 34, which consists of a central bore 35, a radial bore 36 and a widened opening 37 at the end of this radial bore 36 respectively at the surface of the rotor axis. This widened opening 37 is thereby directed towards the supporting surfaces 12 of the feed rails 7, 8 and extends over a defined surface area, which limits the feed of gas to the nozzle heads 14 to a certain area of rotation angles. The inner gas feed line 34 is connected to a gas feed line 38, in this case for pressurised air. The pressurised air is thereby fed in the direction of the arrow 39.

In this FIG. 2, the sphere is indicated at the upwardly directed nozzle head 14 which forms the basis for the spherical segment with the height 28 and the radius 29. Thereby it is also clear, that the spherical segment is flattened parallel as well as symmetrically to a central plane 41 running through the radial axis 24 and that two lateral faces 42, 43 are formed thereby. With regard to the downwardly directed nozzle head 14 which is immersed into the hollow space 11 of the preform 1 it can be seen that by means of these lateral faces 42, 43 passage openings are formed, through which the gas respectively the air, which is blown centrally into the hollow space 11 by the nozzle 16 in direction of the arrows 44, may be discharged again in the direction of the arrows 45. In addition, grooves may be arranged at the surface 46 of the spherical segment respectively the nozzle head 14 which enable the discharge of air in the direction of the arrows 45 also in this area.

Figure 3:
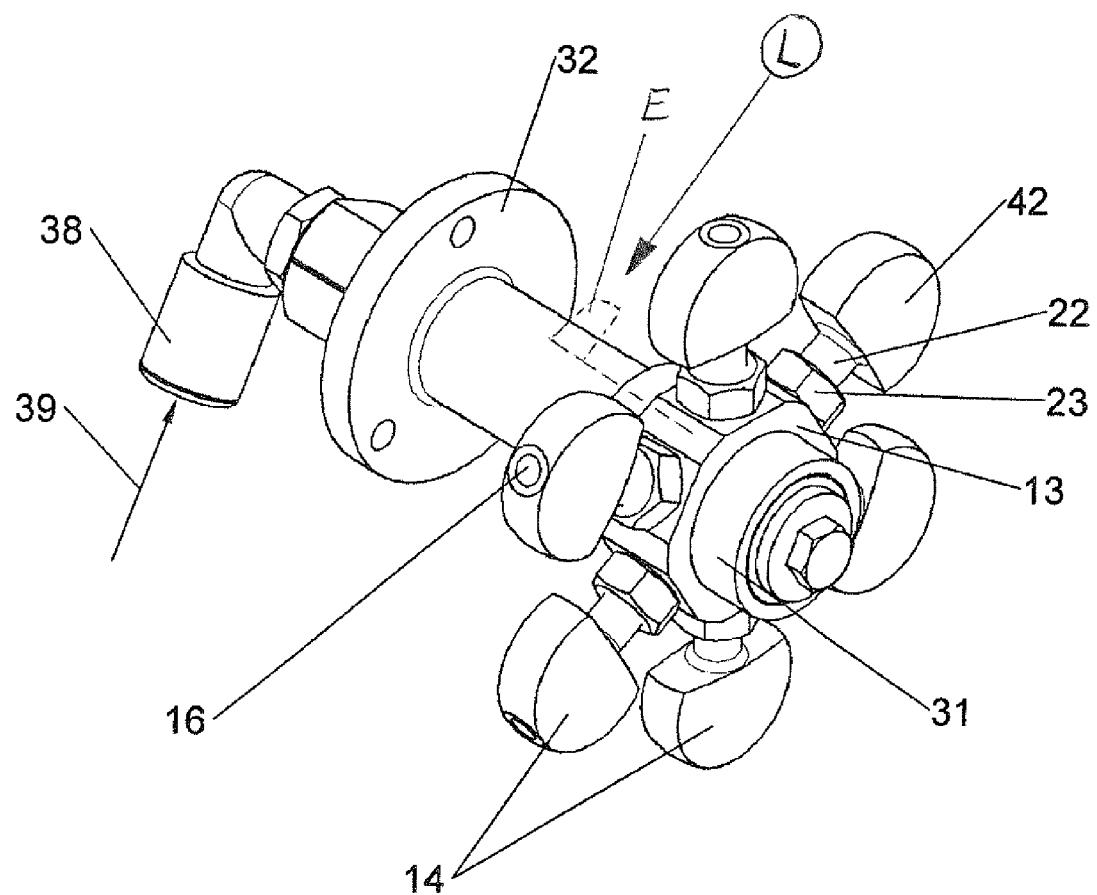

FIG. 3 shows the perspective view of a rotor 13 with the nozzle heads 14 as well as the rotor axis 31 with the pressurised air connector 38, wherein the design and shape of the nozzle heads 14 may be seen more clearly. At the part of the rotor 13 being directed towards the flange 32, also an auxiliary drive may be arranged, namely radially directed elements E which are impinged by an air stream from an air nozzle L. From this perspective illustration it can be seen that the construction unit about the rotor 13 with the nozzle heads 14 forms a unit which may be exchanged easily. It is therefore possible that the inventive blow out device may be adapted in an easy manner to differently shaped preforms 1, by using a construction unit with a rotor 13 with differently shaped nozzle heads 14 and different geometric dimensions. This is enabled in an easy manner via the flange connection 32 and the respective adjustment possibilities. The described and illustrated shape of the nozzle heads 14 is especially suited for preforms with circular cross-section. However, it is also possible to use a different appropriate shape, e.g. the shape of a truncated cone.

During use and operation of the inventive device, at first the nozzle heads 14 at the rotor 13 are adjusted, by means of the length adjustable connection elements 22, to a desired pitch circle and thus the pitch circle distance being necessary for the correct function between the masses 20 and 21. This pitch circle distance is thereby set in such a way that during the rotational movement of the rotor 13 in direction of the arrow 18 the preforms being arranged in a row with the axial distance 10 are not deflected from their position. The distance of the rotor 13 from the supporting surfaces 12 of the feed rails 7, 8 is set in such a way that the desired immersion depth of the nozzle head 14 into the hollow space 11 of the preform 1 is achieved and that simultaneously the subsequent nozzle head 14 in the rotational movement may continuously immerse into the hollow space 11 of the subsequent preform 1. Also— seen in conveying direction 9—the preceding nozzle head 14 shall thereby simultaneously swing out of the hollow space 11 of the preceding preform 1 in a continuous manner. This sequence of motion is normally generated and controlled solely through the feed motion of the preforms 1, which are moved in the conveying direction 9. It may, however, also be supported by an auxiliary drive. The gas stream respectively the pressurised air which is used for blowing out dirt particles and impurities of the hollow space 11 of the preform 1 is fed to the nozzle heads 14 respectively the nozzles 16 only in a certain angular range in the area 19 between the rotor 13 and the feed rails 7, 8. Thereby, pressurised air is only then fed to a nozzle head 14 respectively the respective nozzle 16 during swinging into the hollow space 11 of a preform 1, if no stagnation pressure is generated onto the preform 1 opposite to the conveying direction 9. Subsequently, pressurised air streams out of the nozzle 16 for a predetermined time span and over a certain path of the preform 1, in direction of the arrow 44, at first along a wall, then centrally and then along the opposite wall in the hollow space 11, until it is deflected at the closed end 3 of the preform 1. Subsequently, the air streams along the walls of the hollow space 11 upwardly again and flows out in the direction of the arrows 45 through the open intermediate areas between the immersed nozzle head 14 and the walls of the hollow space 11. The feed of pressurised air to the nozzle 16 may be interrupted when the nozzle head 14 begins to swing out of the hollow space 11. The feed may, however, also be continued, such that the air stream discharging from the nozzle 16 creates an additional conveying force in the conveying direction 9 onto the preform 1. The angular range over which pressurised air is fed to a certain nozzle head 14 in the area 19 during the rotation movement of the rotor 13, is determined by the geometric dimensions of the widened opening 37 at the rotor axis 31. This whole assembly is very reliable and not failure-prone since additional control elements may be omitted and also the feed of pressurised air for blowing out the preforms 1 is solely controlled by the movement of the preforms 1, which interact with the nozzle heads 14.

The invention claimed is:

1. A device for blowing out hollow bodies (1), such as plastic containers, in a conveyor assembly, wherein the hollow bodies (1) are open at one end (2) and are closed at the other end (3) and comprise at the open end (2) a head (4) with a collar (5), the conveyor assembly comprising a transport line (6) with feed rails (7, 8) being inclined in a transport direction (9), wherein the hollow bodies (1) are supported with the collar (5) and with the upwardly directed open end (2) on the feed rails (7, 8) and are arranged relative to one another in a row with an axial distance (10) and are conveyed along the transport line, and wherein a facility for blowing a gas stream into the hollow space (11) of the hollow bodies (1) is arranged in a partial area of the transport line (6), the device comprising:

a rotatable rotor (13) above and at a distance from the feed rails (7, 8), the rotatable rotor having multiple nozzle heads (14) directed radially outwardly, each nozzle head (14) comprising a gas feed line (15) and a nozzle (16), all nozzles (16) being arranged in a common plane wherein the common plane is arranged approximately perpendicular to a supporting surfaces (12) of the feed rails (7, 8) and runs through an central axis (17) of the hollow bodies (1) and during conveying of the hollow bodies (1), the rotor (13) rotates in a conveying direction (12, 18), and wherein, in an area (19) between the rotor (13) and the feed rails (7, 8), at least one nozzle head (14) interacts with the head area (4) of a respective hollow body(l), wherein in the area of an operating position in which a radial axis (24) of a nozzle head (14) coincides with the longitudinal axis (17) of a hollow body (1), the nozzle head (14) is configured to at least partially immerse into the hollow space (11) of the hollow body (1), and form a secure operative connection between the nozzle head (14) and the hollow body (1) to ensure that the nozzle head (14) is taken along by the hollow body (1) and that the rotor (13) is rotated such that the secure operative connection is maintained until the nozzle head (14) swings out of the hollow space (11) of the hollow body (14).

2. The device according to claim 1, wherein the nozzle heads (14) with the nozzles (16) respectively comprise a same pitch circle distance (20, 21) to one another, and the pitch circle distance (20, 21) is a function of the axial distance (10) existing in the conveying direction (9) between adjacent hollow bodies (1).

3. The device according to claim 1, wherein each of the nozzle heads (14) consists of a spherical segment, the height (30) of which is at least as large as the radius (29) of the sphere, whereby the spherical segment is flattened on two sides and parallel as well as symmetrically relative to a central plane (41) and comprises two lateral faces (42, 43).

4. The device according claim 3, wherein, in a partial area of the sphere surface of the spherical segment respectively the nozzle head (14), grooves are formed.

5. The device according to claim 3, wherein an immersion depth of the nozzle head (14) into the hollow space (11) of the hollow body (1) is at least as large as the radius (29) of the spherical segment, out of which the nozzle head (14) is formed.

6. The device according to claim 1, wherein the nozzle heads (14) are connected via a connection element (22) with the rotor and that this connection element (22) comprises a lengthwise adjustment (23).

7. The device according to claim 1, wherein the rotor (13) is supported on a fixed rotor axis (31) and the rotor axis (31) comprises an inner gas feed line (34), which is guided in the area of the common nozzle plane via a bore (36) radially outwards into the bearing bore (49) of the rotor (13), whereby the radially outwards directed bore (36) is directed towards the intermediate area (19) between the rotor (13) and the feed rails (7, 8).

8. The device according to claim 7, wherein, at the outlet end of the radially outwards directed bore (36) at the surface of the rotor axis (31) a widened opening (37) is formed, by which the feed flow area of gas to the respective gas feed line (15) of a nozzle head (14), being in operative connection, is determined.

9. The device according to claim 1, including outer gas feed lines (15) of each nozzle head (14) guided through connection elements (22) radially inwardly up to a bearing bore (49) of the rotor (30).

10. The device according to claim 1, including an auxiliary drive for supporting the rotational movement of the rotor (13).

11. The device according to claim 10, wherein the auxiliary drive is formed in such a way that radially directed elements (E) at the rotor (13) are blown on by an air stream (L).

12. The device according to claim 1, wherein, as seen in the transport direction (9) of the hollow bodies (1), an additional blow-out device is arranged in front of the rotor (13) with the nozzle head (14) by which ionized gas is blown into the hollow space (11) of the hollow bodies (1).

13. The device according to claim 1, wherein, as seen in the transport direction (9) of the hollow bodies (1), two or more rotors (13) with nozzle heads (14) are arranged one behind another.

14. The device according to claim 1, wherein the rotor (13) is unmotorized.

* * * * *